US011982463B2

(12) United States Patent
Lu et al.

(10) Patent No.: US 11,982,463 B2
(45) Date of Patent: May 14, 2024

(54) AIR CONDITIONER INDOOR UNIT AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventors: Gen Lu, Foshan (CN); Xing Liu, Foshan (CN); Zecheng Sun, Foshan (CN); Shuyang Pi, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 371 days.

(21) Appl. No.: 17/427,028

(22) PCT Filed: Oct. 22, 2019

(86) PCT No.: PCT/CN2019/112430
§ 371 (c)(1),
(2) Date: Jul. 29, 2021

(87) PCT Pub. No.: WO2020/155675
PCT Pub. Date: Aug. 6, 2020

(65) Prior Publication Data
US 2022/0099334 A1     Mar. 31, 2022

(30) Foreign Application Priority Data

Jan. 31, 2019  (CN) .......................... 201910100987.7
Jan. 31, 2019  (CN) .......................... 201920179237.9
Mar. 13, 2019  (CN) .......................... 201920321931.X

(51) Int. Cl.
*F24F 13/28*     (2006.01)
*F24F 1/0057*    (2019.01)
(Continued)

(52) U.S. Cl.
CPC ............ *F24F 13/28* (2013.01); *F24F 1/0057* (2019.02); *F24F 1/0073* (2019.02); *F24F 13/20* (2013.01);
(Continued)

(58) Field of Classification Search
CPC ........ F24F 13/28; F24F 1/0057; F24F 1/0073; F24F 13/20; F24F 2013/207; F24F 2221/22; B01D 41/04
See application file for complete search history.

(56) References Cited

U.S. PATENT DOCUMENTS 8,007,574 B2 *   8/2011   Iwano .................. F24F 1/0063
                                                           55/296
8,241,376 B2 *   8/2012   Zhang ...................... F24F 8/90
                                                           55/296
(Continued)

FOREIGN PATENT DOCUMENTS

CN     101576287 A     11/2009
CN     101581471 A     11/2009
(Continued)

OTHER PUBLICATIONS

KR_2008005546_A_1.pdf, English translation of KR 20080055461 A, Jun. 2008, retrieved from DAV Search on Oct. 1, 2023.*
(Continued)

*Primary Examiner* — Ljiljana V. Ciric
(74) *Attorney, Agent, or Firm* — Anova Law Group, PLLC

(57) ABSTRACT

An air conditioner indoor unit includes an electric control box, a cleaner device, and an electrical wire. The cleaner device includes a filter screen rail assembly and a cleaning assembly configured to drive a filter screen to move on the filter screen rail assembly to clean the filter screen. The cleaning assembly includes an electrical wire connection
(Continued)

end. The electrical wire is arranged at the cleaning assembly and the filter screen rail assembly. One end of the electrical wire is connected to the electrical wire connection end, and another end of the electrical wire is connected to the electric control box.

17 Claims, 10 Drawing Sheets

(51) Int. Cl.
*F24F 1/0073* (2019.01)
*F24F 13/20* (2006.01)

(52) U.S. Cl.
CPC ..... *F24F 2013/207* (2013.01); *F24F 2221/22* (2013.01)

(56) References Cited

U.S. PATENT DOCUMENTS

| | | | |
|---|---|---|---|
| 8,303,677 B2 * | 11/2012 | Okada | F24F 8/90 55/296 |
| 10,690,376 B2 * | 6/2020 | Ishigami | B01D 46/56 |
| 10,711,804 B2 * | 7/2020 | Chen | F24F 13/28 |
| 10,746,416 B2 * | 8/2020 | Moro | F24F 1/0057 |
| 11,655,986 B2 * | 5/2023 | Han | F24F 1/0057 62/298 |
| 2004/0000160 A1 | 1/2004 | Takashima et al. | |
| 2021/0041134 A1 * | 2/2021 | Mun | F24F 1/0011 |
| 2022/0099334 A1 * | 3/2022 | Lu | F24F 13/28 |

FOREIGN PATENT DOCUMENTS

| | | | | |
|---|---|---|---|---|
| CN | 103299135 A | * | 9/2013 | ........... F24F 1/0007 |
| CN | 203848475 U | | 9/2014 | |
| CN | 204853892 U | | 12/2015 | |
| CN | 107642822 A | * | 1/2018 | ............... A61L 9/18 |
| CN | 206959172 U | | 2/2018 | |
| CN | 207137575 U | | 3/2018 | |
| CN | 107940637 A | * | 4/2018 | |
| CN | 207268535 U | | 4/2018 | |
| CN | 108488926 A | | 9/2018 | |
| CN | 108767766 A | | 11/2018 | |
| CN | 109442621 A | * | 3/2019 | ............. F24F 13/28 |
| CN | 109668217 A | | 4/2019 | |
| CN | 209541035 U | | 10/2019 | |
| EP | 3093563 A1 | | 11/2016 | |
| ES | 2357862 T3 | * | 5/2011 | ............. F24F 13/28 |
| JP | 2010071562 A | | 4/2010 | |
| JP | 5108120 B2 | * | 12/2012 | ............ F24F 1/0007 |
| JP | 2015188851 A | | 11/2015 | |
| JP | 2016017670 A | | 2/2016 | |
| JP | 2019007653 A | | 1/2019 | |
| KR | 20080055461 A | * | 6/2008 | |
| KR | 20210135066 A | * | 11/2021 | |
| KR | 20210150046 A | * | 12/2021 | |
| WO | 2012096121 A1 | | 7/2012 | |
| WO | 2016143004 A1 | | 9/2016 | |
| WO | WO-2021227422 A1 | * | 11/2021 | ......... B01D 46/0057 |
| WO | WO-2021227433 A1 | * | 11/2021 | ......... B01D 46/0057 |

OTHER PUBLICATIONS

Japan Patent Office (JPO) The Notice of Reasons for Refusal For JP Application No. 2019-564429 dated Jan. 18, 2022 16 Pages (Translation Included).
Japan Patent Office (JPO) Notice of Reasons for Refusal For JP Application No. 2019-564429 dated May 25, 2021 8 Pages (Translation Included).
The European Patent Office (EPO) Extended Search Report for EP Application No. 19798156.6 dated Sep. 29, 2020 14 Pages.
The China National Intellectual Property Administration (CNIPA) The First Office Action for Chinese Application 201910100987.7 dated Oct. 27, 2023 20 Pages (With Translation).

* cited by examiner

AIR CONDITIONER INDOOR UNIT AND AIR CONDITIONER

CROSS REFERENCE TO RELATED APPLICATIONS

The present application is a National Stage Entry under 35 U.S.C. § 371 of International Application No. PCT/CN2019/112430, filed on Oct. 22, 2019, which claims priority to Chinese Application No. 201910100987.7, entitled "AIR CONDITIONER INDOOR UNIT AND AIR CONDITIONER" and filed on Jan. 31, 2019, Chinese Application No. 201920179237.9, entitled "AIR CONDITIONER INDOOR UNIT AND AIR CONDITIONER" and filed on Jan. 31, 2019, and Chinese Application No. 201920321931.X, entitled "AIR CONDITIONER INDOOR UNIT AND AIR CONDITIONER" and filed on Mar. 13, 2019, the entire contents of all of which are hereby incorporated by reference.

TECHNICAL FIELD

The present disclosure relates to the technical field of air conditioners, in particular to an air conditioner indoor unit and an air conditioner.

BACKGROUND

The cleaning device is arranged in the indoor unit to clean the filter screen. The electrical wires for connecting the cleaner device and the electric control box need to be arranged in the indoor unit. In related arts, the electrical wires need to be arranged at the chassis of the indoor unit. Other electrical wires for controlling the movement of the wind deflector are also arranged at the chassis. It is prone to cause mess when the two kinds of electrical wires are both arranged at the chassis, and a large space is required for arranging the two kinds of electrical wires. Thus the demands on design of the wiring structure are high.

The aforementioned content merely provides background information of the technical solution of the present disclosure, and does not necessarily constitute prior art.

SUMMARY

The main purpose of the present disclosure is to provide an air conditioner indoor unit and an air conditioner, aiming at simplifying the electrical wire arrangement of the cleaner device.

In order to achieve the above purpose, the present disclosure provides an indoor unit, and the indoor unit includes:
an electric control box;
a cleaner device including: a filter screen rail assembly; and a cleaning assembly configured to drive a filter screen to move on the filter screen rail assembly to clean the filter screen, and including an electrical wire connection end; and
an electrical wire arranged at the cleaning assembly and the filter screen rail assembly, and one end of the electrical wire is connected to the electrical wire connection end, and another end of the electrical wire is connected to the electric control box.

In an embodiment of the present disclosure, the electrical wire includes: a first electrical wire section arranged at the cleaning assembly, and a second electrical wire section arranged at the filter screen rail assembly; and the first electrical wire section is arranged along a height direction of the cleaning assembly, and/or the second electrical wire section is arranged along a length direction of the filter screen rail assembly.

In an embodiment of the present disclosure, the electrical wire includes: a first electrical wire section arranged at the cleaning assembly, and a second electrical wire section arranged at the filter screen rail assembly; and the first electrical wire section is arranged at an outer side and a front side of the cleaning assembly, the indoor unit is configured to be hung on a wall, the front side of the cleaning assembly is away from the wall, and the outer side of the cleaning assembly is away from a heat exchanger of the indoor unit.

In an embodiment of the present disclosure, a first wire clamping member is provided at the outer side of the cleaning assembly, and a second wire clamping member is provided at the front side of the cleaning assembly. The first electrical wire section passes through the first wire clamping member and the second wire clamping member.

In an embodiment of the present disclosure, the second wire clamping member is adjacent to the filter screen rail assembly, to cause the first electrical wire section and the second electrical wire section to bend.

In an embodiment of the present disclosure, the first wire clamping member includes a first through hole, and the first electrical wire section passes through the first through hole; and/or, the second wire clamping member includes a second through hole, and the first electrical wire section passes through the second through hole.

In an embodiment of the present disclosure, a third wire clamping member is provided at the front side of the cleaning assembly, and the second wire clamping member and the third wire clamping member are arranged at an interval from top to bottom along a height direction of the cleaning assembly, and the first electrical wire section further passes through the third wire clamping member.

In an embodiment of the present disclosure, the third wire clamping member includes a wire routing cavity and an opening communicating with the wire routing cavity, and a portion of the first electrical wire section is inserted into the wire routing cavity through the opening.

In an embodiment of the present disclosure, the electrical wire includes: a first electrical wire section arranged at the cleaning assembly, and a second electrical wire section arranged at the filter screen rail assembly.

The second electrical wire section is arranged at the front side of the filter screen rail assembly. The indoor unit is configured to be hung on a wall, and the front side of the filter screen rail assembly is away from the wall.

In an embodiment of the present disclosure, a fourth wire clamping member is provided at the front side of the filter screen rail assembly, and the second electrical wire section passes through the fourth wire clamping member.

In an embodiment of the present disclosure, the fourth wire clamping member includes: a wire routing groove arranged along a length direction of the filter screen rail assembly, and an opening communicating with the wire routing groove. At least a portion of the second electrical wire section is inserted into the wire routing groove through the opening.

In an embodiment of the present disclosure, the fourth wire clamping member includes: first limit members, and second limit members. The number of the first limit members is at least two, and the two first limit members and the second limit members are arranged alternately at intervals.

The wire routing groove and the opening connected to the wire routing groove are provided between each first limit member and each second limit member and the wire routing groove is connected to the opening, and at least a portion of the second electrical wire section is inserted into the wire routing groove through the opening.

In an embodiment of the present disclosure, the second limit members are arranged along the length direction of the filter screen rail assembly, and at least a portion of the second electrical wire section is supported by the second limit members.

In an embodiment of the present disclosure, the cleaning assembly is connected to one end of the filter screen rail assembly, and the electrical control box is adjacent to another end of the filter screen rail assembly; and/or, the indoor unit further includes a face frame covering the cleaner device, and the cleaner device is detachable from the face frame.

The present disclosure also provides an air conditioner including an outdoor unit and the indoor unit of any of the above embodiments.

The technical solution of the present disclosure is used to arrange the electrical wires for connecting the cleaner device and the electric control box on the cleaning assembly and the filter screen rail assembly. That is, the electrical wire is arranged along the cleaning assembly and the filter screen rail assembly, thereby the wiring space of the chassis of the indoor unit isn't occupied, and the electrical wire arrangement of the cleaner device is simplified.

BRIEF DESCRIPTION OF THE DRAWINGS

In order to more clearly describe the technical solutions in the embodiments of the present application or the existing technologies, the drawings used in the description of the embodiments or the existing technologies are briefly described below. Obviously, the drawings in the following description are only some embodiments of the present disclosure. For those of ordinary skill in the art, other drawings may be obtained according to the structure shown in the drawings without creative work.

DESCRIPTION OF REFERENCE NUMERALS

TABLE 1

Figure 1:
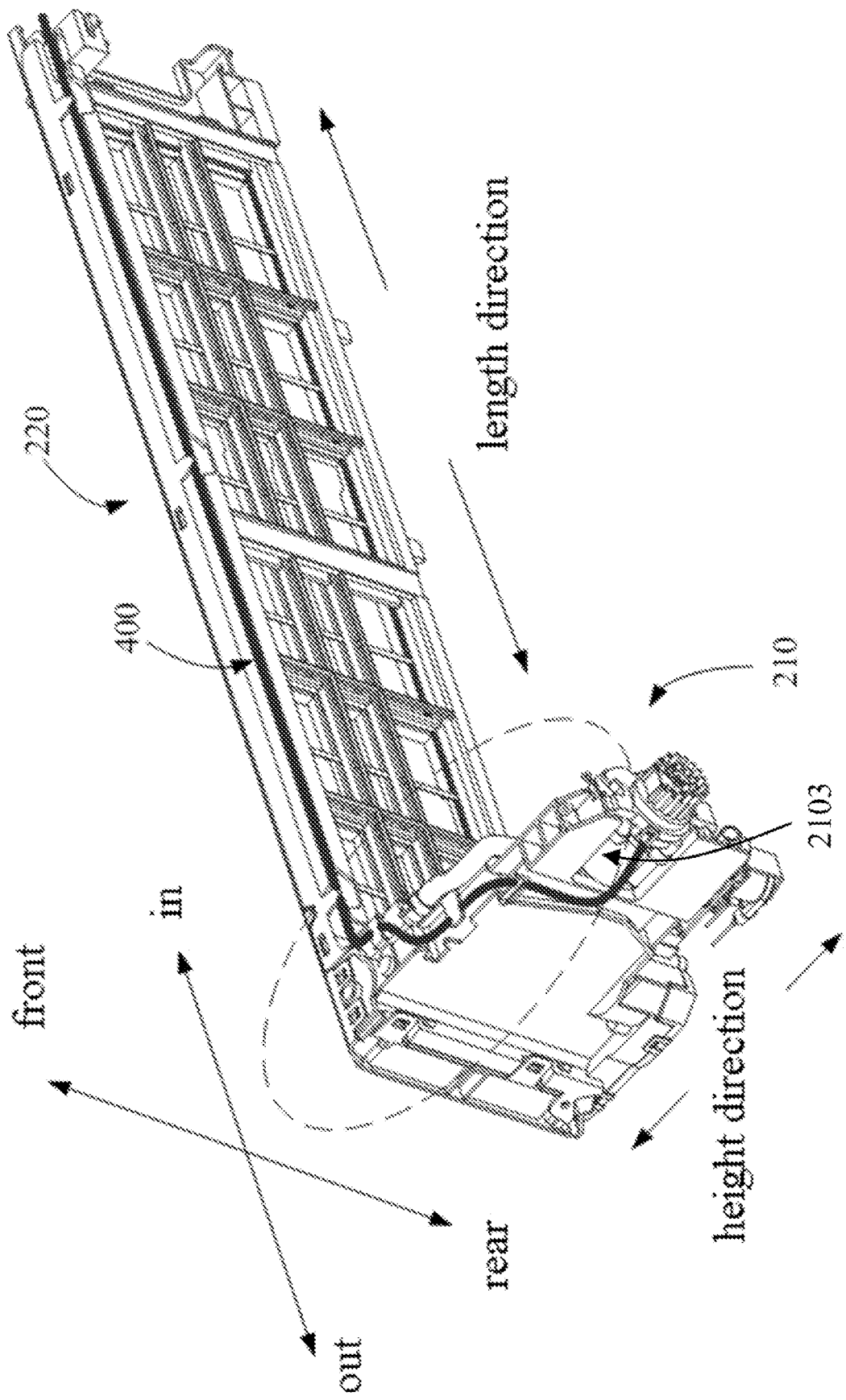
FIG. 1 is a schematic diagram showing an electrical wire arranged at a cleaner device according to an embodiment of the present disclosure.

| Reference Numeral | Name | Reference Numeral | Name |
|---|---|---|---|
| 200 | Cleaner device | 220 | Filter screen rail assembly |
| 210 | Cleaning assembly | 221 | Fourth wire clamping member |
| 211 | First wire clamping member | 2211 | First limit member |
| 2111 | First through hole | 2212 | Second limit member |
| 212 | Second wire clamping member | 2213 | Wire routing groove |
| 2121 | Second through hole | 2214 | Opening |
| 213 | Third wire clamping member | A400 | Electrical wire |
| 2131 | Wire routing cavity | A410 | First electrical wire section |
| 2132 | Opening | A420 | Second electrical wire section |
| 110 | First electrical wire | 4101 | Connector limit member |
| 120 | Second electrical wire | 4102 | Non-connector limit member |
| B200 | Connector | 420 | Second limit member |
| B210 | First connection terminal | 421 | Bearing member |
| B220 | Second connection terminal | 4211 | First bearing part |
| 300 | Air intake grill | 4212 | Second bearing part |
| 401 | Receiving cavity | 422 | Support member |
| 402 | Opening | 4221 | First support portion |
| 410 | First limit member | 4222 | Second support part |
| 411 | Limit rib | | |

The implementation, functional characteristics and advantages of the present disclosure will be further described with reference to the drawings in combination with embodiments.

DETAILED DESCRIPTION OF THE EMBODIMENTS

The technical solution in the embodiments of the present disclosure will be described clearly and completely with reference to the drawings in the embodiment of the present disclosure. It will be appreciated that the described embodiments are only some of the embodiment of the present disclosure, not all of the embodiments. Based on the embodiments in the present disclosure, other alternative embodiments may be perceived by those of skilled in the art that fall within the protection scope of the present disclosure.

It should be noted that all directional indicators (such as upper, lower, left, right, front, rear, etc.) in the embodiment of the present disclosure are only used to explain the relative positional relationship, movement, etc. between various components under a certain specific posture (as shown in the drawings). If the specific posture changes, the directional indicator will also change accordingly.

In the present disclosure, the terms "connected" and "fixed" etc. should be understood in a broad sense, unless otherwise specified and defined. For example, "fixed" can be a fixed connection, a detachable connection, or an forming a part integrally; it can be a mechanical connection or an electrical connection; it can be a direct connection or an indirect connection through an intermediate medium; and it can be the communication between interiors of two elements or the interaction between two elements, unless otherwise specifically defined. For those skilled in the art, the specific meanings of the aforementioned terms in the present disclosure will be appreciated according to practical conditions.

In addition, aspects of the technical solutions between the various embodiments may be combined with each other to form further alternative embodiments within the protection scope of the present disclosure.

The present disclosure relates to an air conditioner indoor unit.

Figure 2:
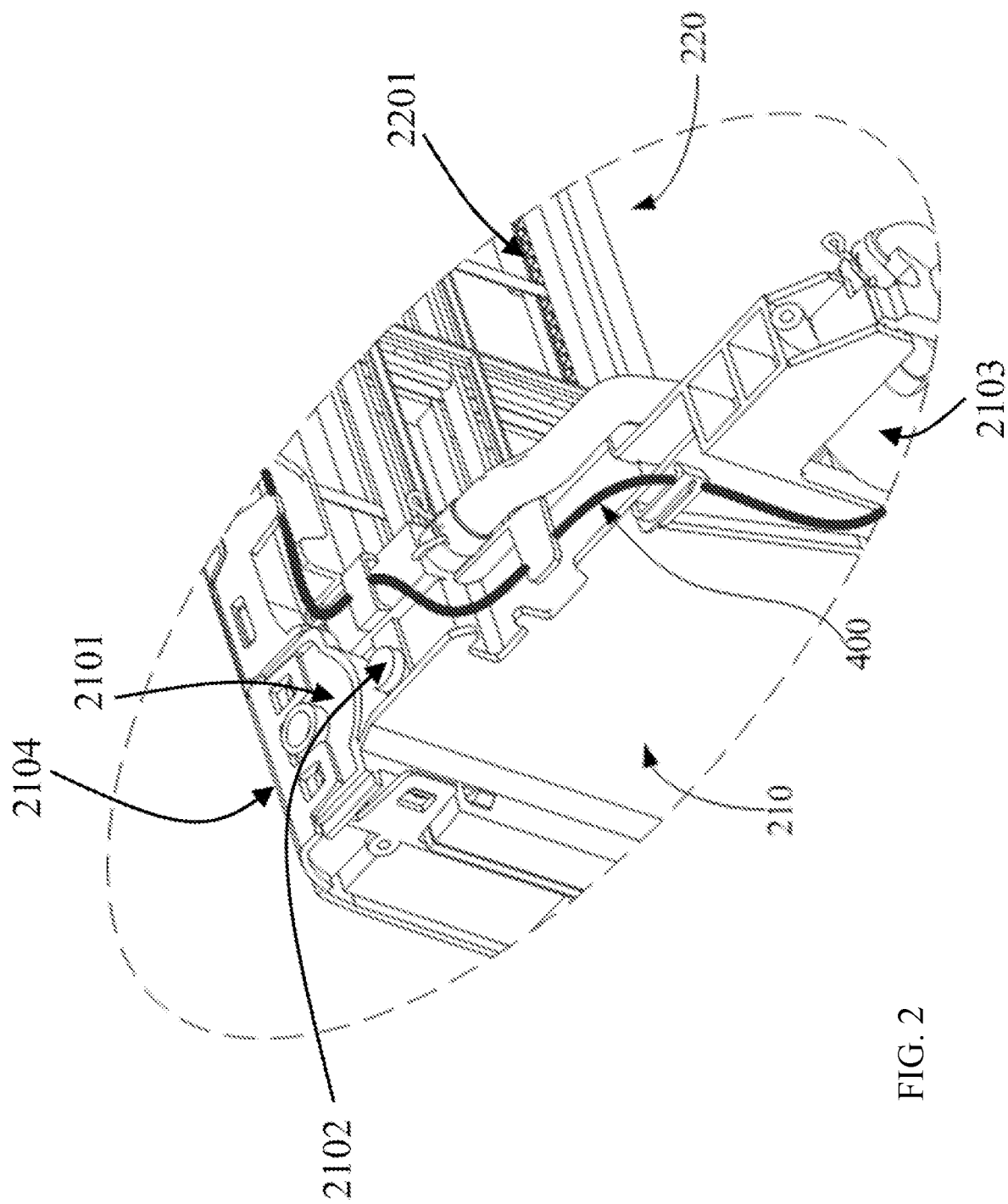
FIG. 2 is an enlarged view of the dotted portion in the figure.
Figure 3:
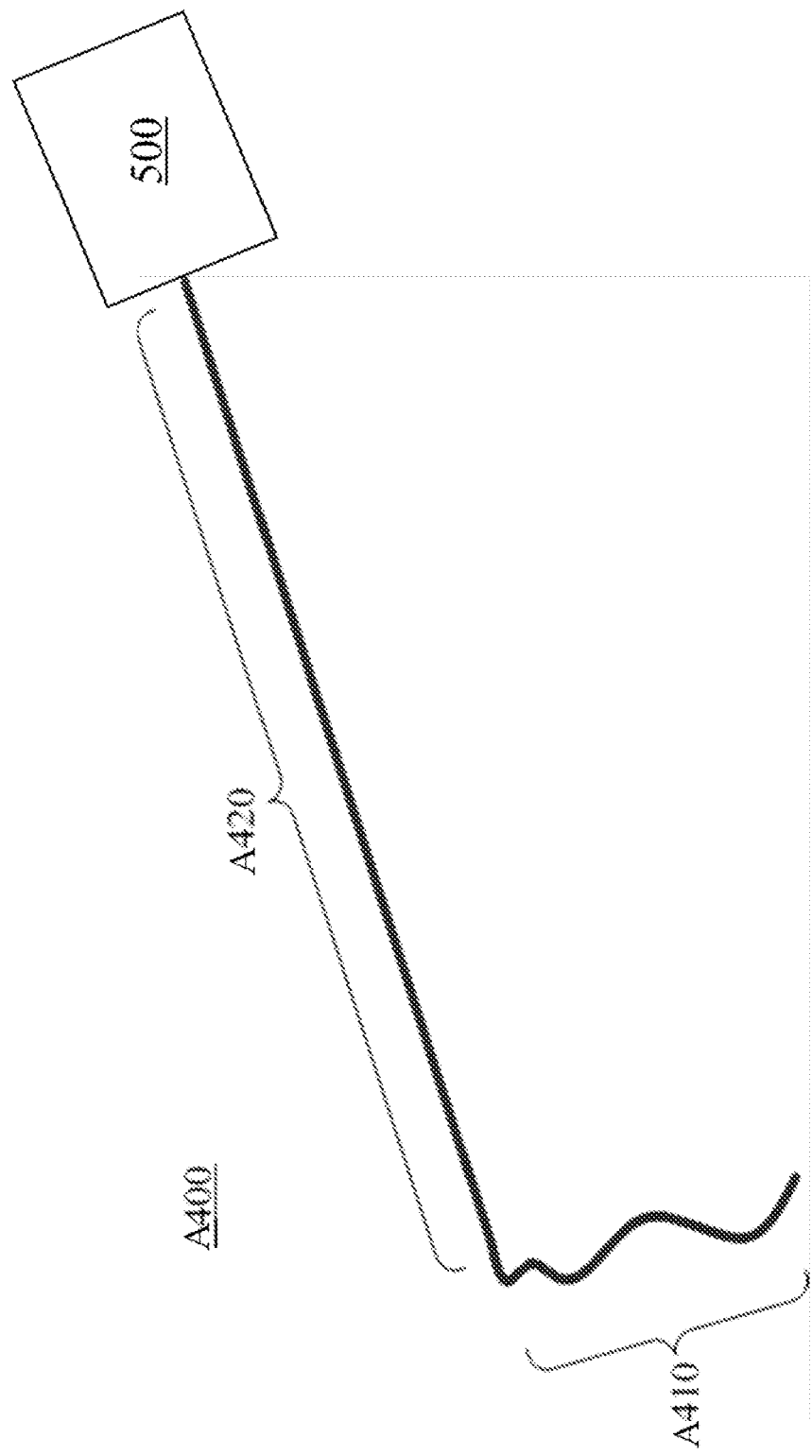
FIG. 3 is a schematic structural diagram of an electrical wire provided at a cleaner device in an embodiment of the present disclosure.

In an embodiment of the present disclosure, as shown in FIG. 1 to FIG. 3, the indoor unit includes:
an electric control box 500;
a cleaner device 200 including: a cleaning assembly 210 configured to drive a filter screen to move on the filter screen rail assembly 220 to clean the filter screen, and including an electrical wire connection end; and
an electrical wire A400 arranged at the cleaning assembly 210 and the filter screen rail assembly 220, and one end of the electrical wire A400 is connected to the electrical wire connection end, and another end of the electrical wire A400 is connected to the electric control box 500.

In this embodiment, it will be appreciated that the electric control box is configured with a circuit board therein, which is an important module for controlling the indoor unit. The cleaner device 200 is an assembly for driving and cleaning the filter screen. That is, the air is circulated in the process of operating the conditioner indoor unit circulates air, and the air needs to be filter screened through the filter screen after entering the indoor unit and before passing through the heat exchanger. After the indoor unit is used for a long time, the filter screen becomes dirty. The cleaning of the filter screen is achieved by the cleaner device 200. The process of cleaning the filter screen 200 by the cleaner device 200 is as follows: firstly, the filter screen is driven to run in the cleaner device 200, and the cleaning of the filter screen is realized in the process of operation. The specific structure of the cleaner device 200 can be referred to other patent disclosures of the present applicant before the application date of the present disclosure. In order to achieve that the cleaner device 200 is controlled, it is necessary to connect the electric control box and the cleaner device 200 through the electrical wire A400 for transmitting electric power and/or signals.

For example, the cleaning assembly 210 is configured with a driving structure 2101 for driving the movement of the filter screen, a cleaning structure 2102 for cleaning the filter screen, a water pump 2103, and a water cavity 2104. The condensed water generated by the indoor unit is pumped by the water pump 2103 to the water cavity 2104, and the movement of the filter screen is driven by the driving structure 2101 which cleans the filter screen. The filter screen rail assembly is configured with a corresponding rail 2201, and the filter screen can be moved in the rail. In general, the electrical wire A400 may be connected with a water pump and a drive structure of the cleaning assembly 210, so the electrical wire A400 is divided into two sections. The first section A410 thereof is configured at the cleaning assembly 210 and another section A420 thereof is configured at the filter screen rail assembly 220. That is, the electrical wire A400 is configured along the cleaning assembly 210 and the filter screen rail assembly 220 to avoid that the space of other electrical wires is occupied for the arrangement of the electrical wire A400 on the chassis of the indoor unit, and an overly messy situation with other electrical wires is avoided, thereby the arrangement of the electrical wire A400 connecting the cleaner device 200 is simplified.

Figure 4:
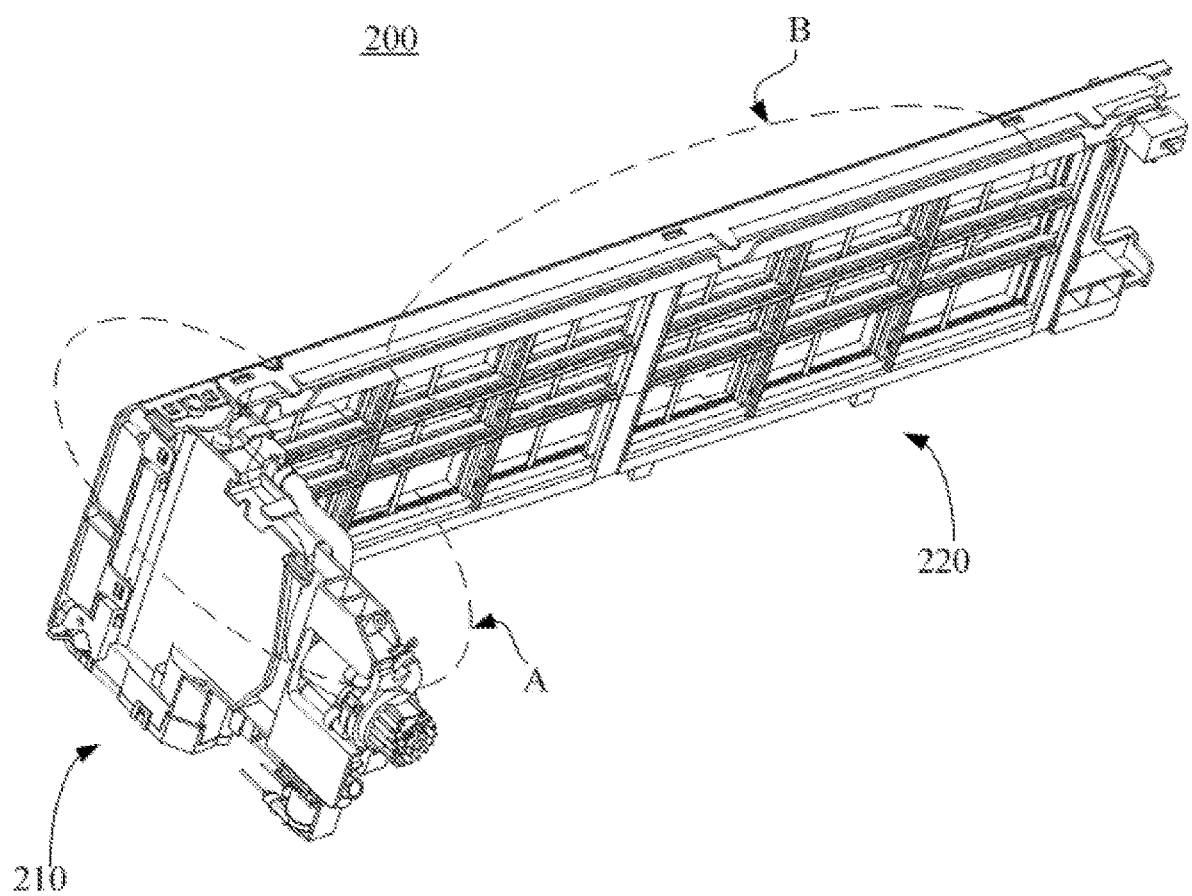
FIG. 4 is a schematic structural diagram of a cleaner device according to an embodiment of the present disclosure.
Figure 5:
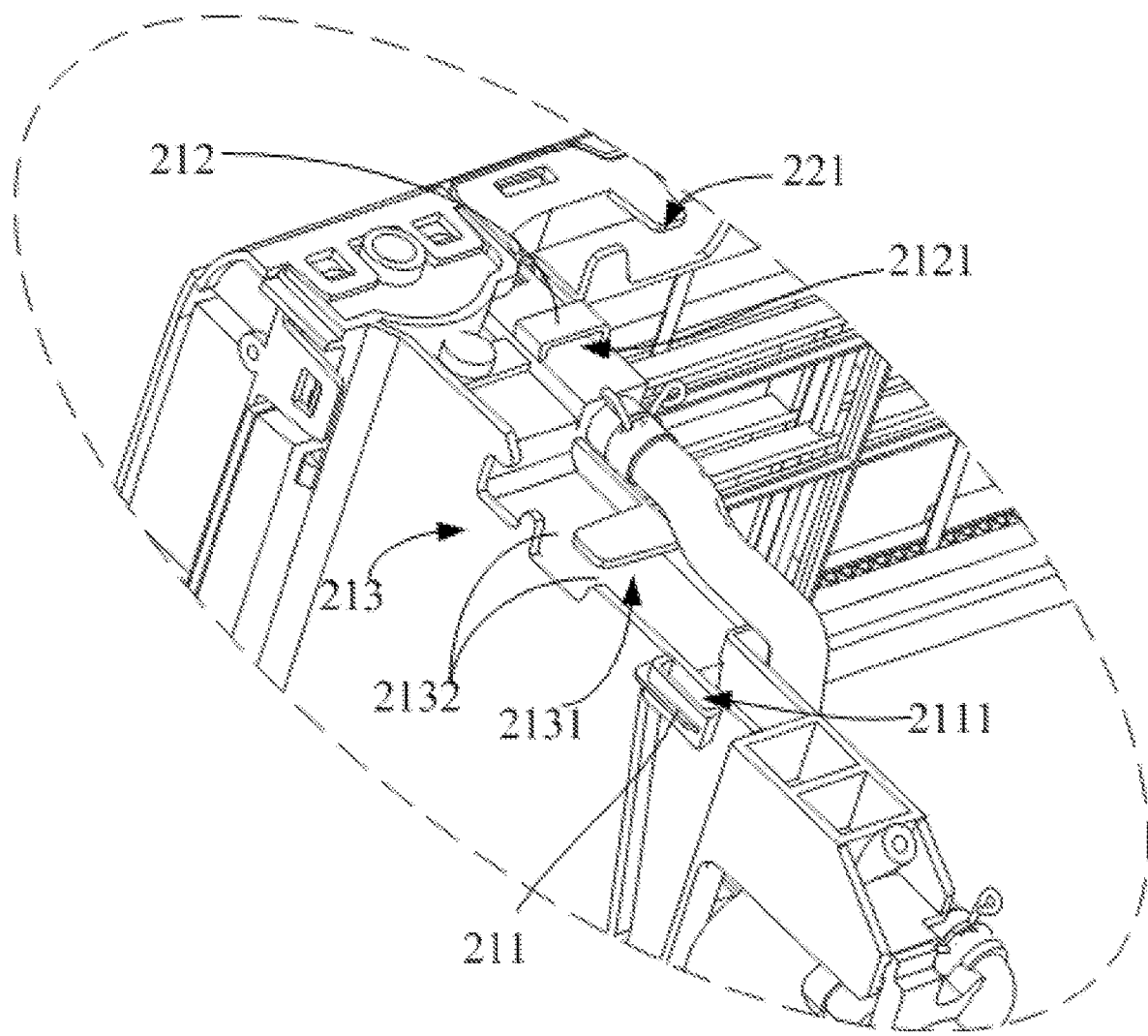
FIG. 5 is an enlarged view of a portion labeled A in FIG. 4.

In an embodiment of the present disclosure, as shown in FIG. 3 to FIG. 5, the electrical wire A400 includes: a first electrical wire section A410 arranged at the cleaning assembly 210, and a second electrical wire section A420 arranged at the filter screen rail assembly 220; and The first electrical wire section A410 is arranged along a height direction of the cleaning assembly 210, and/or the second electrical wire section A420 is arranged along a length direction of the filter screen rail assembly 220.

In this embodiment, in general, the cleaning assembly 210 and the filter screen rail assembly 220 are intersecting setting to fully utilize the internal space of the indoor unit, so that the first electrical wire section A410 is configured along the height direction of the cleaning assembly 210. The second electrical wire section A420 is configured along the length of the filter screen rail assembly 220, thus the length of the electrical wire A400 is minimized.

In an embodiment of the present disclosure, as shown in FIG. 3 to FIG. 5, the electrical wire A400 includes:
a first electrical wire section A410 arranged at the cleaning assembly 210, and
a second electrical wire section A420 arranged at the filter screen rail assembly 220.

Figure 12:
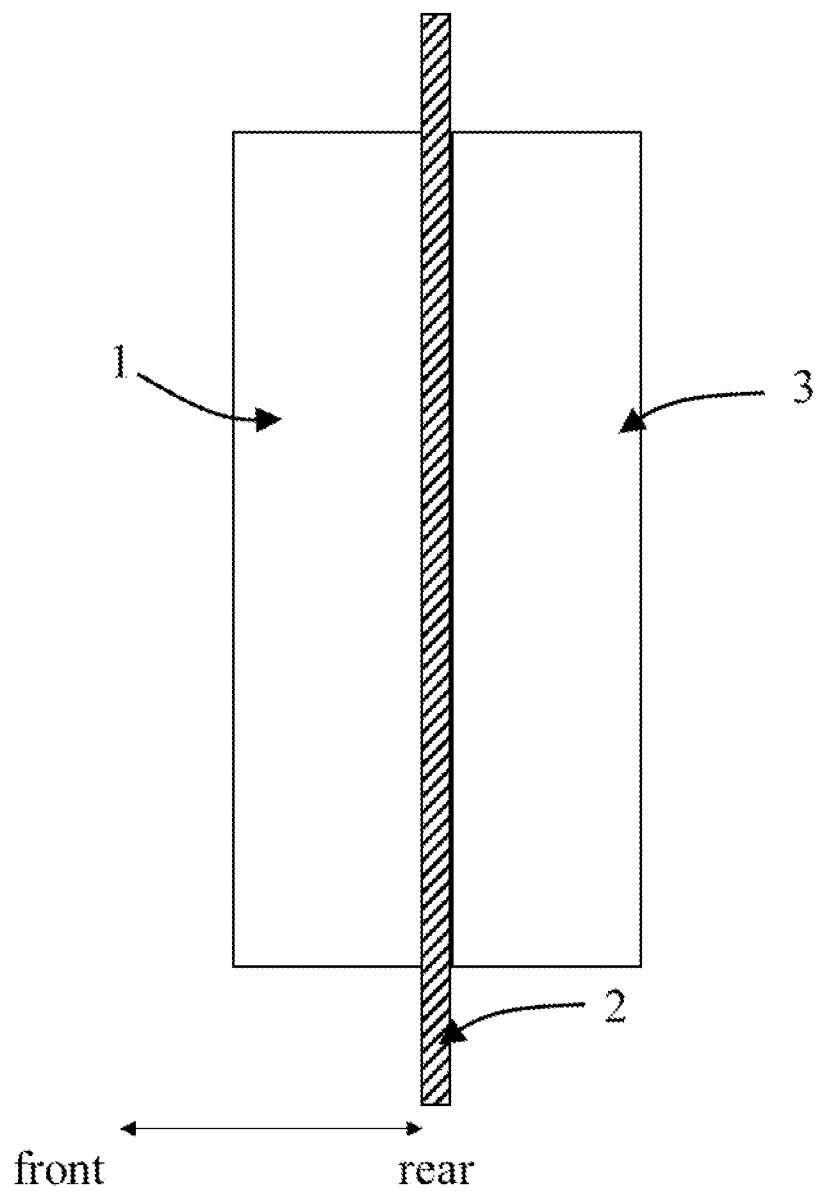
FIG. 12 is schematic diagram of an indoor unit according to an embodiment of the present disclosure.

The first electrical wire section A410 is arranged at an outer side and a front side of the cleaning assembly 210. For example, as shown in FIG. 12, the indoor unit 1 is configured to be hung on one side of a wall 2, and an outdoor unit 3 is configured to be hung on another side of the wall 2, and the front side of the cleaning assembly 210 is away from the wall 2, and the outer side of the cleaning assembly 210 is away from a heat exchanger of the indoor unit 1.

In this embodiment, in order to realize the arrangement of the assemblies in the cleaning assembly 210, the portion of the first electrical wire section A410 is configured on the outer side of cleaning assembly, and the remaining portion thereof is configured on the front side of cleaning assembly. Thus, the setting of the assembly in the cleaning assembly 210 is facilitated, and the electrical wire A400 is also convenient for being integrally arranged. The side of the cleaning assembly 210 away from the wall is the front side thereof. The side thereof close to the wall is the rear side, and the side of the heat exchanger close to the indoor unit is the inner side, and the side of the heat exchanger away from the indoor unit is the outer side. In addition, the space corresponding to the front side of the cleaning assembly 210 is relatively abundant, and the front side space of the cleaning assembly 210 can be fully utilized.

As shown in FIG. 4 and FIG. 5, a first wire clamping member 211 is provided at the outer side of the cleaning assembly 210, and a second wire clamping member 212 is provided at the front side of the cleaning assembly 210. The first electrical wire section A410 passes through the first wire clamping member 211 and the second wire clamping member 212. In this embodiment, the first wire clamping member 211 is a structure for forming a limit to the first electrical wire section A410, and thus the various forms can be taken. For example, a restriction form of other electrical wires in the indoor unit is taken. For the second wire clamping member 212, the operation is the same as the first wire clamping member 211. The first electrical wire section A410 is configured on the outer side and the front side of the cleaning assembly 210 by the arrangement of the first wire clamping member 211 and the second wire clamping member 212.

In an embodiment, as shown in FIG. 4 and FIG. 5, the second wire clamping member 212 is adjacent to the filter screen rail assembly 220, to cause the first electrical wire section A410 and the second electrical wire section A420 to bend. In this embodiment, by such an arrangement thereof, the first electrical wire section A410 and the second electrical wire section A420 are formed in a bend shape, and are corresponded to the joint of the cleaning assembly 210 and the filter screen rail assembly 220, and thus, the electrical wire A400 isn't in a state of suspension for coming off the cleaner device 200, thereby the electrical wire A400 is prevented from being squeezed when assembling the indoor unit.

As shown in FIG. 4 and FIG. 5, the first wire clamping member 211 includes a first through hole 2111, and the first electrical wire section A410 passes through the first through hole 2111; and/or, the second wire clamping member 212 includes a second through hole 2121, and the first electrical wire section A410 passes through the second through hole 2121.

In this embodiment, the first wire clamping member 211 is configured as a closed annular structure, and is configured with a first through hole 2111, so that the first through hole 2111 is passed through by the first electrical wire section A410. That is, the first wire clamping member 211 is passed through by the first electrical wire section A410. The first electrical wire section A410 is confined within the first through hole 2111 to prevent offset. The same operation is true for the second wire clamping member 212, and the details are not repeated herein. The first electrical wire section A410 is configured along the outer side and the front side of the cleaning assembly 210, and thus the first electrical wire section A410 is in a bent state, and the first electrical wire section A410 is prevented from detaching by the arrangement of the first wire clamping member 211 and the second wire clamping member 212.

Further, as shown in FIG. 4 and FIG. 5, a third wire clamping member 213 is provided at the front side of the cleaning assembly 210, and the second wire clamping member 212 and the third wire clamping member 213 are arranged at an interval from top to bottom along a height direction of the cleaning assembly 210, and the first electrical wire section A410 further passes through the third wire clamping member 213. In this embodiment, the third wire clamping member 213 is a structure for forming a limit to the first electrical wire section A410, and thus various forms can be employed. For example, the height direction of the cleaning assembly 210 is exemplified by the state in which the indoor unit is suspended from the wall. The cleaning assembly 210 is configured with a certain height. Thus, the first electrical wire section A410 located on the front side of the cleaning assembly 210 is effectively fixed to prevent the first electrical wire section A410 from being partially suspended by arranging the second wire clamping member 212 and the third wire clamping member 213 at an interval.

As shown in FIG. 4 and FIG. 5, the third wire clamping member 213 includes a wire routing cavity 2131 and an opening 2132 communicating with the wire routing cavity 2131, and a portion of the first electrical wire section A410 is inserted into the wire routing cavity 2131 through the opening 2132. In this embodiment, the third wire clamping member 213 is not a closed annular structure and is configured with a wire routing cavity 2131. A portion of the first electrical wire section A410 is inserted into the wire routing cavity 2131 through the opening 2132, such that the first electrical wire section A410 as a whole is in a state of passing through the third wire clamping member 213. After the first electrical wire section A410 passes through the first wire clamping member 211 or the second wire clamping member 212, the portion of the first electrical wire section A410 is inserted into the third wire clamping member 213, thereby the assembly efficiency of the first electrical wire section A410 is improved. Moreover, since the first wire clamping member 211 and the second wire clamping member 212 have a closed annular structure, the first electrical wire section A410 is not easily separated from the first wire clamping member 211 and the second wire clamping member 212. The arrangement efficiency of the first electrical wire section A410 is improved on the premise of guaranteeing the fixing effect of the electrical wire section A410.

Figure 6:
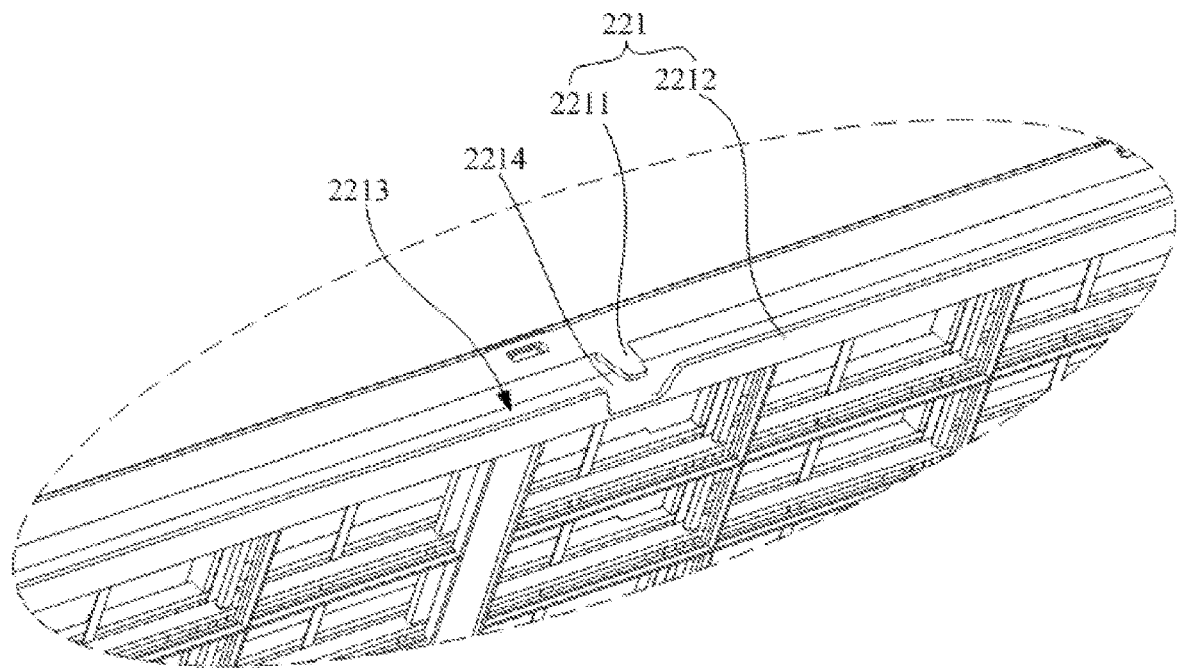
FIG. 6 is an enlarged view of a portion labeled B in FIG. 4.

In an embodiment of the present disclosure, as shown in FIG. 4 and FIG. 6, the electrical wire A400 includes:
 a first electrical wire section A410 arranged at the cleaning assembly 210, and
 a second electrical wire section A420 arranged at the filter screen rail assembly 220.

The second electrical wire section A420 is arranged at the front side of the filter screen rail assembly 220. The indoor unit is configured to be hung on a wall, and the front side of the filter screen rail assembly 220 is away from the wall. In this embodiment, as the portion of the first electrical wire section A410 is configured on the front side of the cleaning assembly 210, the utilization rate of space is also improved by the arrangement of the second electrical wire section A420 on the front side of the filter screen rail assembly 220. Thus, the length of the electrical wire is minimized.

As shown in FIG. 6, a fourth wire clamping member 221 at the front side of the filter screen rail assembly 220, and the second electrical wire section A 420 passes through the fourth wire clamping member 221. The fourth wire clamping member 221 is a structure for forming a limit to the second electrical wire section A420, and thus various forms can be employed. When the second electrical wire section A420 is passed through the fourth wire clamping member 221, the second electrical wire section A420 is confined to the fourth wire clamping member 221, thereby the placement of the second electrical wire section A420 in the filter screen rail assembly 220 is achieved. With the arrangement of the first electrical wire section A410 and the above structure, the electrical wire A400 can be quickly configured in the cleaner device 200.

In an embodiment of the present disclosure, as shown in FIG. 6, the fourth wire clamping member 221 includes: a wire routing groove 2213 arranged along a length direction of the filter screen rail assembly 220, and an opening 2214 communicating with the wire routing groove 2213. At least a portion of the second electrical wire section A420 is inserted into the wire routing groove 2213 through the opening 2214. In this embodiment, the wire routing groove 2213 is a space for accommodating the second electrical wire section A420, and the wire routing groove 2213 is configured along the length direction of the filter screen rail assembly 220, so that the second electrical wire section A420 generally isn't configured with a bend. Thus, the second electrical wire section A420 is inserted into the wire routing groove 2213 through the opening 2214, and the second electrical wire section A420 is in a state of passing through the fourth wire clamping member 221. If the length of the wire routing groove 2213 is long, the second electrical wire section A420 may be almost completely inserted into the wire routing groove 2213, and the end of the second electrical wire section A420 is connected to the electric control box. If the length of the wire routing groove 2213 is small, a portion of the second electrical wire sections A420 is inserted into the wire routing groove.

As shown in FIG. 6, the fourth wire clamping member 221 includes: a first limit member 2211, and a second limit member 2212. The number of the first limit members 2211 is at least two, and the two first limit members 2211 and the second limit member 2212 are arranged alternately at intervals. The wire routing groove 2213 and the wire routing groove 2213 connected to the opening 2214 are provided between each first limit member 2211 and each second limit member 2212, and the wire routing groove 2213 is connected to the opening 2214, and at least a portion of the second electrical wire section A420 is inserted into the wire routing groove 2213 through the opening 2214.

In an embodiment of the present disclosure, as shown in FIG. 6, the second limit members 2212 are arranged along the length direction of the filter screen rail assembly 220, and at least a portion of the second electrical wire section A420 is supported by the second limit member 2212. In this embodiment, the second electrical wire section A420 is configured with a tendency to fall downward under the action of gravity, and the second limit member 2212 is configured along the length direction of the filter screen rail assembly 220. That is, the second limit member 2212 is configured with a certain length. At least a portion of the second electrical wire section A420 is supported by the second limit member 2212, so that the arrangement of the second electrical wire section A420 is more stable.

In an embodiment of the present disclosure, as shown in FIG. 1, the cleaning assembly 210 is connected to one end of the filter screen rail assembly 220, and the electrical control box is adjacent to another end of the filter screen rail assembly 220. In this embodiment, the cleaning assembly 210 is located at one end of the filter screen rail assembly 220, and the electrical control box is adjacent to another end of the filter screen rail assembly 220. The heat exchanger and the air duct assembly are located between the cleaning assembly 210 and the electrical control box. Thus, the space of the indoor unit can be fully utilized.

The indoor unit further includes a face frame (not shown) covering the cleaner device 200, and the cleaner device 200 is detachable from the face frame.

In this embodiment, the face frame is configured with an air inlet. The filter screen rail assembly 220 is located at the air inlet, and the air passes through the air opening, that is, the air passes through the filter screen rail assembly 220, and the air is filtered by the filter screen located in the filter screen rail assembly. The cleaner device is detachable relative to the face frame, such that the cleaner device 200 is a separate functional assembly that the function of the cleaner device 200 can be tested before assembling the indoor unit. Further, since the electrical wire A400 is configured on the cleaner device 200 (the cleaning assembly 210 and the filter screen rail assembly 220). Thus, the arrangement of the electrical wire A400 can be realized before the assembly of the indoor unit, and the cleaner device 200 can be prevented from being installed in the air conditioner. The arrangement of the electrical wire A400 is avoided to be realized only after the cleaner device 200 being installed in the chassis of the indoor unit. The assembly efficiency is further improved.

In other embodiments of the present disclosure, as shown in FIG. 7 to FIG. 11, the indoor unit includes:
a first electrical wire 110 extending towards the electrical control box, and one end of the first electrical wire 110 is connected to the cleaning assembly, and another end of the first electrical wire 110 includes a first connection terminal B210;

a second electrical wire 120 extending towards the cleaning assembly, and one end of the second electrical wire 120 is connected to the electric control box, and another end of the second electrical wire 120 includes a second connection terminal B220; and an air intake grill 300 arranged between the cleaning assembly and the electrical control box, the first connection terminal B210 is connected to the second connection terminal B220 to form a connector B200, and the connector B200 is fixed at the air intake grill 300.

The air intake grill 300 is configured at the air inlet of the indoor unit, and the filter screen is configured on the air intake grill 300. The air is circulated in the process of operating the conditioner indoor unit, and the air is filtered by the filter screen when passing through the air intake grill 300. After the indoor unit is used for a long time, the filter screen is easy to collect dust or the like, so the filter screen is cleaned by setting the cleaning assembly.

The cleaning assembly is located at one end of the air intake grill 300. The cleaning assembly includes a cleaning box, a cleaning structure, a driving structure, and an electric device. The electric device includes a motor, a water pump, a drain valve, or the like. The cleaning box is configured with a water cavity, and the movement of the filter screen is driven by the driving structure which is driven by the motor, and the cleaning structure is driven to clean the filter screen. The dirt on the filter screen is separated from the filter screen and dropped into the water cavity. The water is pumped by the water pump, and then that is mixed with the dirt to become the dirty water, and the drain valve is controlled to dewater the dirty water.

In order to realize the control of the cleaning assembly, the electric device of the cleaning assembly needs to be electrically connected to the electric control box, so the first electrical wire 110 is necessary to be configured. One end of the first electrical wire 100 is connected with the electric device of the cleaning assembly, and another end of the first electrical wire is configured with the first connection terminal B210. The electric control box and the cleaning assembly are arranged at an interval, and the electric control box is configured at another end of the air intake grill 300. The electric control box is configured with a second electrical wire 120, and the end of the second electrical wire 120 is configured with a second connection terminal B220. The first electrical wire 110 extends toward the electric control box, and the second electrical wire 120 extends toward the cleaning assembly, so that the first connection terminal B210 and the second connection terminal B220 are connected to be the connector B200, and the connector B200 are fixed at the air intake grill 300. Since the control box is used as the control center of the indoor unit, it is needed to be electrically connected with other assemblies. That is, the area where the control box is located is configured with more connection terminals. In this embodiment, the second electrical wire 120 extends toward the cleaning assembly. That is, the second connection terminal B220 is away from the electric control box, and the second connection terminal B220 and the first connection terminal B210 are connected to be the connector B200. That is, the first connection terminal B210 is also away from the electric control box. Thus, the number of connection terminal of the area where the electric control box is located is reduced. The messy connection terminals are avoided, thereby the management of electrical wire is facilitated, and the electromagnetic interference is also reduced to some extent by reducing the number of connection terminals in the area where the electric control box is located.

The connector B200 is fixed at the air intake grill 300, so that the connector B200 is effectively fixed. However, the connector B200 is connected by the first connection terminal B210 and the second connection terminal B220 (for example, the electrical connection between the electrical wire 110 and the second electrical wire 120 is achieved by slot-plug fit). In order to make the first electrical wire 110, the first connection terminal B210, the second connection terminal B220, and the second electrical wire 120 be effectively fixed as a whole, in an embodiment of the present disclosure, as shown in FIG. 1 and FIG. 2, at least a portion of the first electrical wire 110 is fixed at the air intake grill 300, and at least a portion of the second electrical wire 120 is fixed at the air intake grill 300. In this embodiment, at least a portion of the first electrical wires 110 is fixed at the air intake grill 300, and at least a portion of the second electrical wires 120 is fixed at the air intake grill 300, so that the first electrical wires 110, the first connection terminal B210, and the second connection terminal B220 and the second electrical wire 120 are effectively fixed as a whole.

For example, the first electrical wire 110 includes a first electrical wire section and a second electrical wire section. The first electrical wire section of the first electrical wire 110 is taken out from the cleaning assembly, and the second electrical wire section of the first electrical wire 110 is fixed at the air intake grill 300. The second electrical wire 120 includes the first electrical wire section and the second electrical wire section. The first electrical wire section of the second electrical wire 120 is taken out from the electric control box, and the second electrical wire section of the second electrical wire 120 is fixed at the electric grille 300. The second electrical wire section of the first electrical wire 110 is configured with a first connection terminal B210. The second electrical wire section of the second electrical wire 120 is configured with the second connection terminal B220, and the first connection terminal B210 and the second connection terminal B220 are connected to be connector B200.

Figure 7:
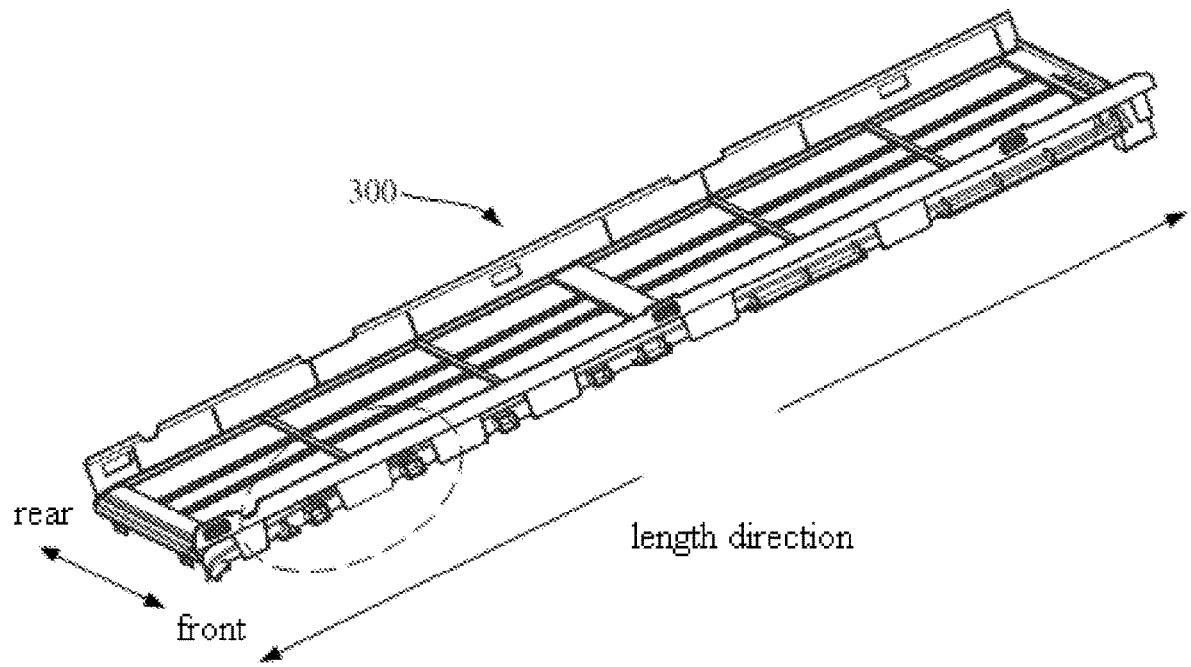
FIG. 7 is a schematic structural diagram showing the first electrical wire and the second electrical wire being fixed at the air intake grill after being connected according to an embodiment of the present disclosure.

In an embodiment of the present disclosure, as shown in FIG. 7, the connector B200 is fixed at a front side of the air intake grill 300, and at least the portion of the first electrical wire 110 is fixed at the front side of the air intake grill 300. At least the portion of the second electrical wire 120 is fixed at the front side of the air intake grill 300, and after the indoor unit is hung on a wall, the front side of the air intake grill 300 is away from the wall, and a rear side of the air intake grill 300 is adjacent to the wall. In this embodiment, when the indoor unit is assembled, the rear side of the air intake grill 300 abuts against the chassis, and the connector B200, at least a portion of the first electrical wire 110, and at least a portion of the second electrical wire 120 are fixed at the front side of the air intake grill 300. The installation work is easily performed for workers.

In an embodiment of the present disclosure, as shown in FIG. 8 to FIG. 11, the front side of the air intake grill 300 includes: a plurality of first limit members 410 arranged at intervals along a length direction of the air intake grill 300, and a plurality of second limit members 420, and each second limit member is arranged between each two adjacent first limit members 410, and a receiving cavity 401 and an opening 402 communicating with the receiving cavity 401 are configured by each first limit member 410 and each second limit member 420. The connector B200 is inserted into the receiving cavity 401 through the opening 402, and at least the portion of the first electrical wire 110 is inserted into the receiving cavity 401 through the opening 402, and at least the portion of the second electrical wire 120 is inserted into the receiving cavity 401 through the opening 402.

Figure 9:
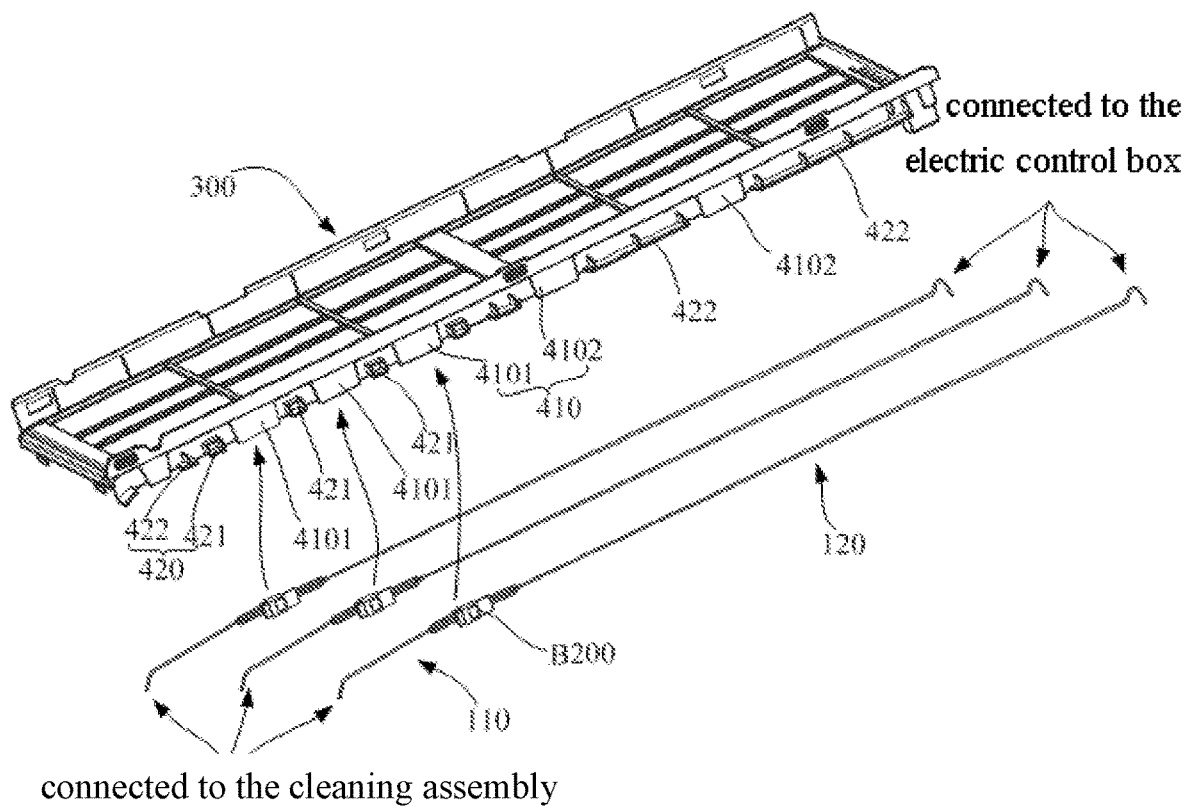
FIG. 9 is an exploded view of the first electrical wire, the second electrical wire, and the air intake grill in an embodiment of the present disclosure.
Figure 10:
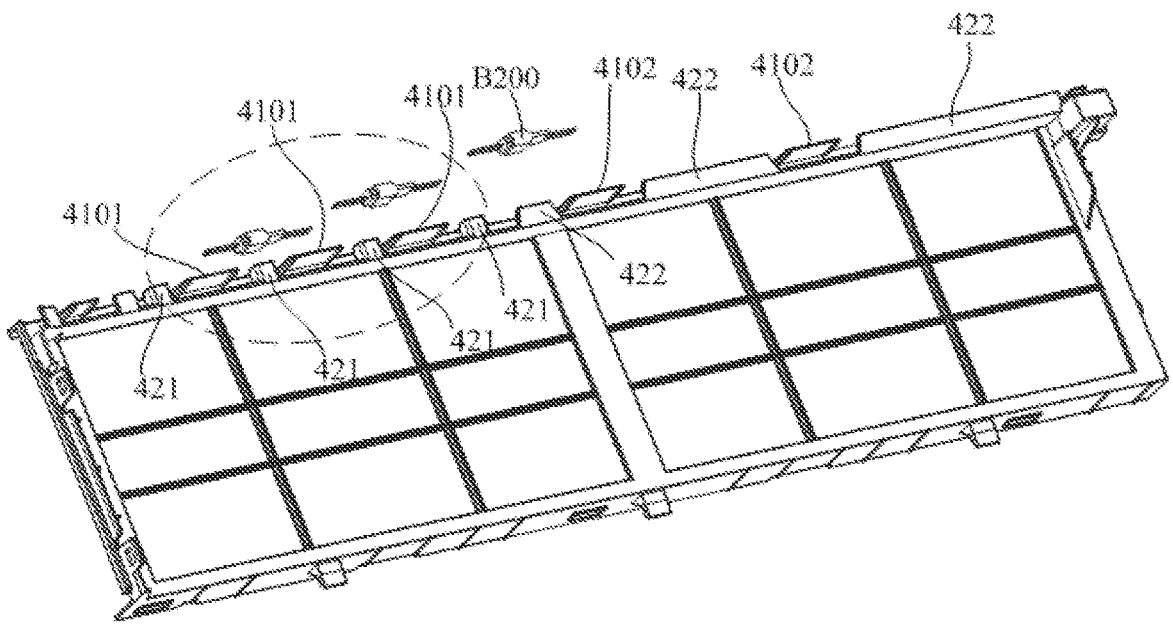
FIG. 10 is an exploded view of the air intake grill and the connector according to an embodiment of the present disclosure.

In this embodiment, as shown in FIG. 9, the receiving cavity 401 extends along the length direction of the air intake grill 300, and the receiving cavity 401 and the opening 402 are the space formed by the first limit member 410 and the second limit member 420. After the connector B200, at least a portion of the first electrical wire 110, and at least a portion of the second electrical wire 120 are inserted into the receiving cavity 401, the connector B200, at least a portion of the first electrical wire 110 and at least a portion of the second electrical wire 120 are limited by the first limit member 410 and the second limit member 420 to avoid dropping of the electrical wire. Since the first electrical wire 110 and the second electrical wire 120 are integrally long after the docking, the opening 402 is configured in the embodiment, and the first electrical wire 110 and the second electrical wire 120 are integrated as a whole, and can be inserted into the receiving cavity 401 through the opening 402. Thus, the installing work is more convenient.

Figure 8:
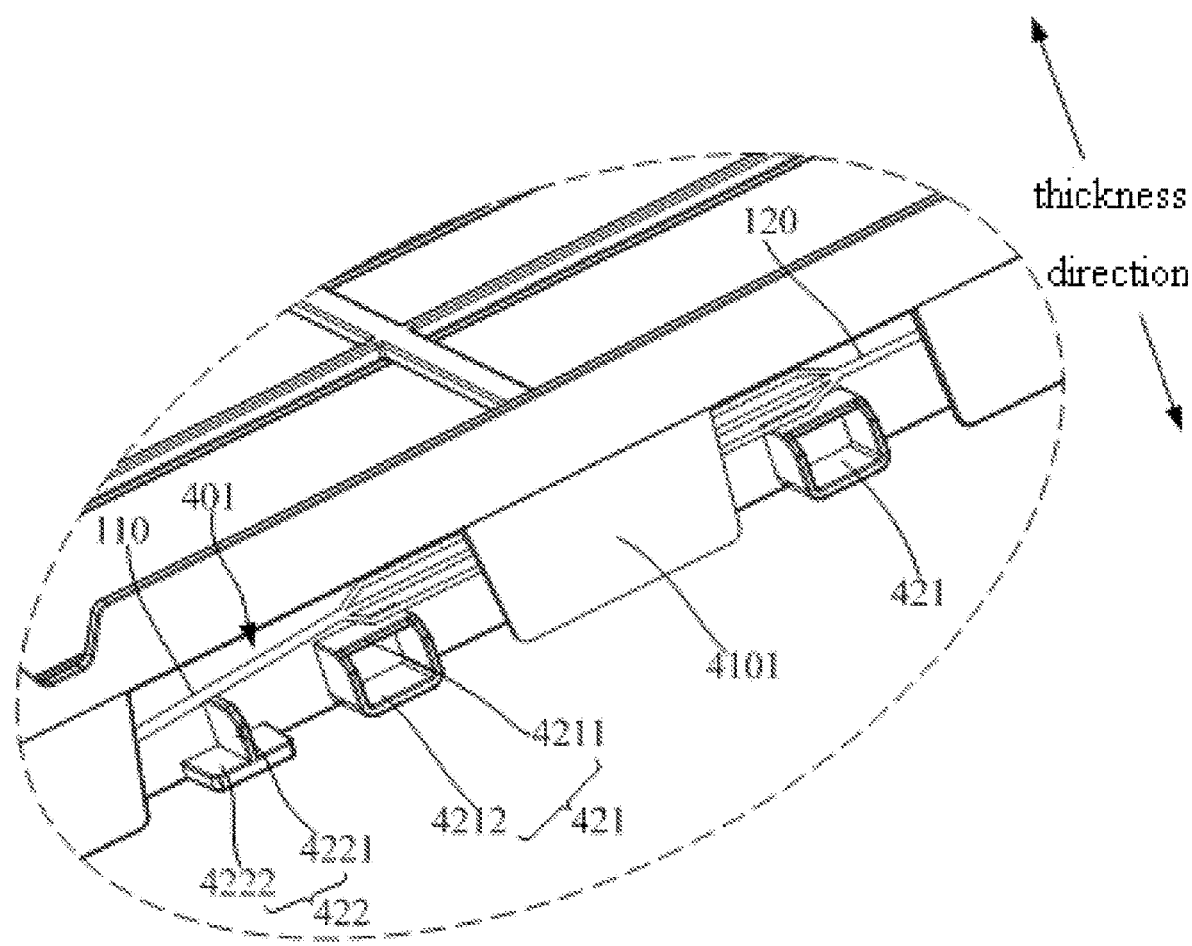
FIG. 8 an enlarged view of the dotted portion in FIG. 7.
Figure 11:
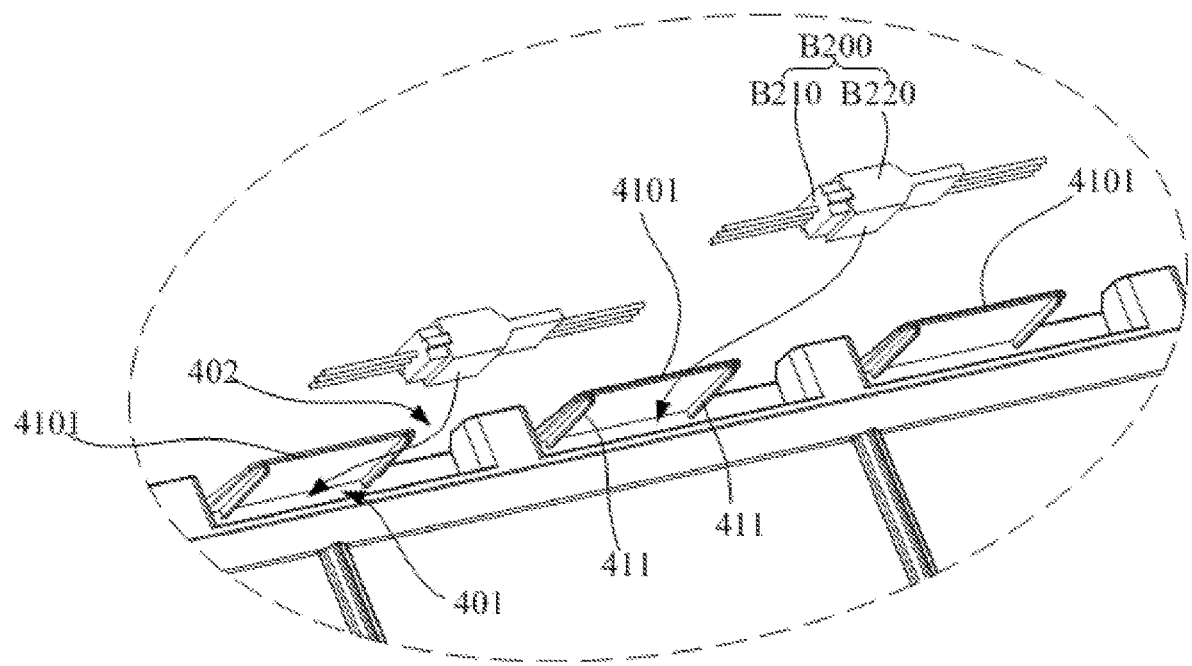
FIG. 11 is an enlarged view of the dotted portion in FIG. 10.

In an embodiment of the present disclosure, as shown in FIG. 8 and FIG. 11, the first limit member 410 extends along a thickness direction of the air intake grill 300, and the connector B200 is arranged at an inner side of the first limit member 410 which is adjacent to the receiving cavity 401. In this embodiment, the first limit member 410 extends along the thickness direction of the air intake grill 300. When the indoor unit is in the wall-hanging state, the first limit member 410 extends in the up and down directions, so that the forward and backward movement of the entirety after being connected by the first electrical wire 110 and the second electrical wire 120 to the indoor unit is prevented.

In an embodiment of the present disclosure, as shown in FIG. 11, the inner side of the first limit member 410 is provided with at least two limit ribs 411, the at least two limit ribs 411 are arranged at intervals along the length direction of the air intake grill 300, and the connector B200 is arranged between the two limit ribs 411. In the embodiment, the connector B200 is placed between the two limit ribs 411 by configuring the limit rib 411, so that the connector B200 can be prevented from reciprocating along the length direction of the air intake grill 300, thereby the connector B200 is better limited.

In an embodiment of the present disclosure, as shown in FIG. 7 and FIG. 8, at least the portion of the first electrical wire 110 is supported by the second limit member 420, and at least the portion of the second electrical wire 120 is supported by the second limit member. In this embodiment, the second limit member 420 protrudes toward the front of the air intake grill 300, and the second limit member 420 is configured to support the first electrical wire 110 and the second electrical wire 120. After the first electrical wire 110 and the second electrical wire 110 being connected, which as a whole is inserted into the receiving cavity 401, and is supported by the second limit member 420 under the action of gravity.

In an embodiment of the present disclosure, as shown in FIG. 8 and FIG. 9, one first limit member 410 with the connector B200 at the inner side is defined as a connector limit member 4101, and remaining first limit members 410 are defined as non-connector limit members 4102.

One second limit member 420 adjacent to the connector limit member 4101 is defined as a bearing member 421, and one second limit member 420 adjacent to the non-connector limit members 4102 is defined as a support member 422.

The bearing member 421 includes a first bearing part 4211 in a plate shape and arranged horizontally, and a second bearing part 4212 fixed to the first bearing part 4211, and at least the portion of the first electrical wire 110 and at least the portion of the second electrical wire 120 are supported by the first bearing part 4211.

The support member 422 includes a first support part 4221 in a plate shape and arranged horizontally, and a second support part 4222 fixed to the first support part 4221, and at least the portion of the first electrical wire 110 and at least the portion of the second electrical wire 120 are supported by the first support part 4221.

In this embodiment, the connector B200 is needed to be inserted into the inner side of the connector limit member 4101 through the opening 402, and the bearing member 421 is configured adjacent to the connector limit member 4101. The bearing member 421 is configured with the first bearing part 4211 that is in a plate shape and longitudinally configured. The contact area between the first bearing part 4211 and the electrical wire in the vicinity of the connector B200 is increased, so that the fixing of the connector B200 is more stable. The non-connector limit member 4102 does not need to be configured with the connector B200. Therefore, the support member 422 is configured which includes a first support portion 4221 and a second support part 4222, and the first support portion 4221 is a plate shape and longitudinally configured. The operating space when embedding the electrical wire is increased, and the assembly is facilitated.

In an embodiment of the present disclosure, the indoor unit includes a face frame (not shown). The face frame having an air inlet, and the air intake grill 300 is arranged at the air inlet, and the air intake grill 300 is separable from the face frame. In this embodiment, the air intake grill 300 is separable relative to the face frame. Therefore, before the indoor unit is assembled, the air intake grill 300 and the filter screen can be separately assembled to avoid the need to fit the face frame to assemble the filter screen.

The present disclosure also provides an air conditioner including an air conditioner outdoor unit and the indoor unit of any one of the above embodiments.

The indoor unit includes:
a first electrical wire 110 extending towards the electrical control box, and one end of the first electrical wire 110 is connected to the cleaning assembly, and another end of the first electrical wire 110 includes a first connection terminal B210;
a second electrical wire 120 extending towards the cleaning assembly, and one end of the second electrical wire 120 is connected to the electric control box, and another end of the second electrical wire 120 includes a second connection terminal B220; and
an air intake grill 300 arranged between the cleaning assembly and the electrical control box, the first connection terminal B210 is connected to the second connection terminal B220 to form a connector B200, and the connector B200 is fixed at the air intake grill 300.

The air conditioner outdoor unit may be an air conditioner outdoor unit in the prior art, which constitutes a refrigerant circulation with the indoor unit.

The structure of the indoor unit of this embodiment can be referred to the above embodiments as described. Since the structure of the indoor unit of this embodiment adopts the technical solution of the above embodiment. At least the beneficial effects of the technical solutions of the above embodiments are obtained, and not be repeated here.

The present disclosure also provides an air conditioner including an air conditioner outdoor unit and the indoor unit of any one of the above embodiments.

The indoor unit includes: an electric control box (not shown); a cleaner device 200 including: a filter screen rail assembly 220; and a cleaning assembly 210 configured to drive a filter screen to move on the filter screen rail assembly 220 to clean the filter screen, and including an electrical wire connection end (not shown in the figure); and an electrical wire A400 arranged at the cleaning assembly 210 and the filter screen rail assembly 220, and one end of the electrical wire A400 is connected to the electrical wire connection end, and another end of the electrical wire A400 is connected to the electric control box.

The specific structure of the indoor unit of this embodiment can be referred to the above embodiments as described. Since the structure of the indoor unit of this embodiment adopts the technical solution of the above embodiment, at least the beneficial effects of the technical solutions of the above embodiments are obtained, and not be repeated here. The refrigerant circulation is realized between the air conditioner outdoor unit and the indoor unit. The specific structure of the air conditioner outdoor unit can be referred to the air conditioner outdoor unit in the prior art, and not be repeated.

The foregoing description merely depicts some embodiments of the present application and therefore is not intended to limit the scope of the application. An equivalent structural or flow changes made by using the content of the specification and drawings of the present application, or any direct or indirect applications of the disclosure on any other related fields shall all fall in the scope of the application.

What is claimed is:

1. An air conditioner indoor unit comprising:
an electric control box;
a cleaner device including:
a filter screen rail assembly including a rail for a filter screen to move along; and
a cleaning assembly including a driving structure, a cleaning structure, a water pump, and a water cavity, the cleaning assembly being configured to drive a filter screen to move on the filter screen rail assembly to clean the filter screen, and including an electrical wire connection end;
an air intake grill arranged between the cleaning assembly and the electrical control box; and
an electrical wire arranged at the cleaning assembly and the filter screen rail assembly, one end of the electrical wire being connected to the electrical wire connection end, and another end of the electrical wire being connected to the electric control box, and the electrical wire including:
a first electrical wire extending towards the electrical control box, one end of the first electrical wire being connected to the cleaning assembly, and another end of the first electrical wire including a first connection terminal; and
a second electrical wire extending towards the cleaning assembly, one end of the second electrical wire being connected to the electric control box, and another end of the second electrical wire including a second connection terminal;
wherein:
at least a portion of the first electrical wire is fixed at the air intake grill, and at least a portion of the second electrical wire is fixed at the air intake grill;

the connector, the at least the portion of the first electrical wire, and the at least the portion of the second electrical wire are fixed at a front side of the air intake grill that is away from a rear side of the indoor unit, the rear side of the indoor unit is for hanging the indoor unit to a wall, a rear side of the air intake grill is adjacent to the rear side of the indoor unit;

the front side of the air intake grill includes:
  a plurality of first limit members arranged at intervals along a length direction of the air intake grill; and
  a plurality of second limit members each arranged between two adjacent ones of the plurality of first limit members;
a receiving cavity and an opening communicating with the receiving cavity are formed by one of the plurality of first limit members and a corresponding one of the plurality of second limit members; and
the opening is for inserting the connector, the at least the portion of the first electrical wire, and the at least the portion of the second electrical wire into the receiving cavity.

2. The indoor unit of claim 1, wherein:
the electrical wire includes:
  a first electrical wire section arranged at the cleaning assembly; and
  a second electrical wire section arranged at the filter screen rail assembly; and
the first electrical wire section is arranged along a height direction of the cleaning assembly, and/or the second electrical wire section is arranged along a length direction of the filter screen rail assembly.

3. The indoor unit of claim 1, wherein:
the electrical wire includes:
  a first electrical wire section arranged at the cleaning assembly; and
  a second electrical wire section arranged at the filter screen rail assembly; and
the first electrical wire section is arranged at a front side of the cleaning assembly, the front side of the cleaning assembly being a side away from the rear side of the indoor unit.

4. The indoor unit of claim 3, further comprising:
a first wire clamp; and
a second wire clamp at the front side of the cleaning assembly;
wherein the first electrical wire section passes through the first wire clamp and the second wire clamp.

5. The indoor unit of claim 4, wherein the second wire clamp is adjacent to the filter screen rail assembly and configured to cause the first electrical wire section and the second electrical wire section to bend relative to each other.

6. The indoor unit of claim 4, wherein:
the first wire clamp includes a first through hole, and the first electrical wire section passes through the first through hole; and/or
the second wire clamp includes a second through hole, and the first electrical wire section passes through the second through hole.

7. The indoor unit of claim 4, further comprising:
a third wire clamp at the front side of the cleaning assembly;
wherein:
  the second wire clamp and the third wire clamp are arranged at an interval from top to bottom along a height direction of the cleaning assembly;
  the first electrical wire section further passes through the third wire clamp;
  the opening is a first opening;
  the third wire c clamp includes a wire routing cavity and a second opening communicating with the wire routing cavity, the second opening being for inserting a portion of the first electrical wire section into the wire routing cavity.

8. The indoor unit of claim 1, further comprising:
a wire clamping member at a front side of the filter screen rail assembly that is away from the rear side of the indoor unit;
wherein the electrical wire includes:
  a first electrical wire section arranged at the cleaning assembly; and
  a second electrical wire section arranged at the front side of the filter screen rail assembly and passing through the wire clamping member.

9. The indoor unit of claim 8, wherein:
the opening is a first opening; and
the wire clamping member includes:
  a wire routing groove arranged along a length direction of the filter screen rail assembly; and
  a second opening communicating with the wire routing groove, the opening being for inserting at least a portion of the second electrical wire section into the wire routing groove.

10. The indoor unit of claim 8, wherein:
the wire clamping member includes two first limit members and a second limit member arranged alternately at intervals, the second limit member being arranged along a length direction of the filter screen rail assembly;
the opening is a first opening; and
a wire routing groove and a second opening connected to the wire routing groove are formed between one of the first limit member and the second limit member, the second opening being for inserting at least a portion of the second electrical wire section into the wire routing groove; and
at least a portion of the second electrical wire section is supported by the second limit member.

11. The indoor unit of claim 1, wherein:
the cleaning assembly is connected to one end of the filter screen rail assembly, and the electrical control box is adjacent to another end of the filter screen rail assembly; and/or
the cleaner device is covered by a face frame of the indoor unit and is detachable from the face frame.

12. The indoor unit of claim 1, wherein each of the plurality of first limit members extends along a thickness direction of the air intake grill, and the connector is arranged at an inner side of one of the plurality of first limit members, the inner side of the one of the plurality of first limit members being adjacent to the receiving cavity.

13. The indoor unit of claim 12, wherein the inner side of the one of the plurality of first limit members is provided with two limit ribs arranged at intervals along the length direction of the air intake grill, and the connector is arranged between the two limit ribs.

14. The indoor unit of claim 12, wherein the at least the portion of the first electrical wire and the at least the portion of the second electrical wire are supported by one of the plurality of second limit members.

15. The indoor unit of claim 14, wherein:
the plurality of first limit members include:

a connector limit member with the connector at the inner side of the connector limit member; and a non-connector limit member at which the connector is not arranged;

the plurality of second limit members include:

a bearing member adjacent to the connector limit member; and a support member adjacent to the non-connector limit member;

the bearing member includes a first bearing part and a second bearing part fixed to each other, the first bearing part being in a plate shape and arranged horizontally, and the at least the portion of the first electrical wire and the at least the portion of the second electrical wire being supported by the first bearing part; and the support member includes a first support part and a second support part fixed to each other, the first support part being in a plate shape and arranged horizontally, and the at least the portion of the first electrical wire and the at least the portion of the second electrical wire being supported by the first support part.

16. The indoor unit of claim 1, further comprising:

a face frame including an air inlet;

wherein the air intake grill is arranged at the air inlet and is separable from the face frame.

17. An air conditioner comprising:

an outdoor unit; and an indoor unit including:

an electric control box;

a cleaner device including:

a filter screen rail assembly including a rail for a filter screen to move along; and a cleaning assembly including a driving structure, a cleaning structure, a water pump, and a water cavity, the cleaning assembly being configured to drive a filter screen to move on the filter screen rail assembly to clean the filter screen, and including an electrical wire connection end;

an air intake grill arranged between the cleaning assembly and the electrical control box; and an electrical wire arranged at the cleaning assembly and the filter screen rail assembly, one end of the electrical wire being connected to the electrical wire connection end, and another end of the electrical wire being connected to the electric control box, and the electrical wire including:

a first electrical wire extending towards the electrical control box, one end of the first electrical wire being connected to the cleaning assembly, and another end of the first electrical wire including a first connection terminal; and a second electrical wire extending towards the cleaning assembly, one end of the second electrical wire being connected to the electric control box, and another end of the second electrical wire including a second connection terminal;

wherein:

at least a portion of the first electrical wire is fixed at the air intake grill, and at least a portion of the second electrical wire is fixed at the air intake grill;

the connector, the at least the portion of the first electrical wire, and the at least the portion of the second electrical wire are fixed at a front side of the air intake grill that is away from a rear side of the indoor unit, the rear side of the indoor unit is for hanging the indoor unit to a wall, a rear side of the air intake grill is adjacent to the rear side of the indoor unit;

the front side of the air intake grill includes:

a plurality of first limit members arranged at intervals along a length direction of the air intake grill; and a plurality of second limit members each arranged between two adjacent ones of the plurality of first limit members;

a receiving cavity and an opening communicating with the receiving cavity are formed by one of the plurality of first limit members and a corresponding one of the plurality of second limit members; and the opening is for inserting the connector, the at least the portion of the first electrical wire, and the at least the portion of the second electrical wire into the receiving cavity.

* * * * *